United States Patent
Jezewski

(10) Patent No.: US 6,568,294 B2
(45) Date of Patent: May 27, 2003

(54) SHIFTER WITH AUTOMATIC AND MANUAL SHIFT MODES AND WITH SHIFT POSITION INDICATORS

(75) Inventor: Christopher J. Jezewski, Grand Haven, MI (US)

(73) Assignee: Grand Haven Stamped Products, division of JSJ Corporation, Grand Haven, MI (US)

( * ) Notice: Subject to any disclaimer, the term of this patent is extended or adjusted under 35 U.S.C. 154(b) by 69 days.

(21) Appl. No.: 09/788,907

(22) Filed: Feb. 20, 2001

(65) Prior Publication Data

US 2001/0032524 A1 Oct. 25, 2001

Related U.S. Application Data

(60) Provisional application No. 60/183,946, filed on Feb. 22, 2000.

(51) Int. Cl.[7] .............................................. F16H 59/02
(52) U.S. Cl. .............................. 74/473.18; 74/473.12; 74/473.14; 116/28.1
(58) Field of Search ...................... 74/473.12, 473.15, 74/473.18, 473.33, 471 XY; 116/28.1

(56) References Cited

U.S. PATENT DOCUMENTS

| | | | |
|---|---|---|---|
| 5,626,093 A | | 5/1997 | Jacobs et al. |
| 5,682,789 A | * | 11/1997 | DeCrouppe et al. ..... 74/473.18 |
| 5,775,166 A | | 7/1998 | Osborn et al. |
| 5,848,855 A | | 12/1998 | Roossien |
| 5,862,708 A | * | 1/1999 | Shamoto ................... 74/473.18 |
| 5,946,976 A | * | 9/1999 | Miyoshi et al. ........... 74/473.18 |
| 6,000,296 A | * | 12/1999 | Sundquist ................ 74/473.18 |
| 6,044,790 A | * | 4/2000 | Murakami ................ 116/28.1 |
| 6,082,286 A | | 7/2000 | Kovach et al. |
| 6,401,564 B1 | * | 6/2002 | Lee .......................... 74/473.18 |
| 6,422,106 B1 | * | 7/2002 | Lee .......................... 74/473.18 |

FOREIGN PATENT DOCUMENTS

| | | | |
|---|---|---|---|
| JP | 11-34684 | * | 2/1999 |
| JP | 11-34685 | * | 2/1999 |

* cited by examiner

*Primary Examiner*—William C Joyce
(74) *Attorney, Agent, or Firm*—Price, Heneveld, Cooper Dewitt & Litton

(57) ABSTRACT

A shifter includes a base and a shift lever pivoted to the base for movement along a single planar shift path. The single planar shift path includes a first portion having P, R, N, and D (i.e. an automatic-shift mode) and a second portion with 4, 3, 2, and 1 (i.e. a manual shift mode). A switch on the shift lever operates a solenoid for changing between an automatic shift mode where the first portion is operable, and a manual shift mode where the second portion is operable. A shift lever position indicator indicates a position of the shift lever in all its positions. The shift lever position indicator includes first and second polarized screens and a first and second polarized light sources arranged to selectively illuminate the first and second indicia when the shift lever is in the automatic or manual shift mode.

17 Claims, 9 Drawing Sheets

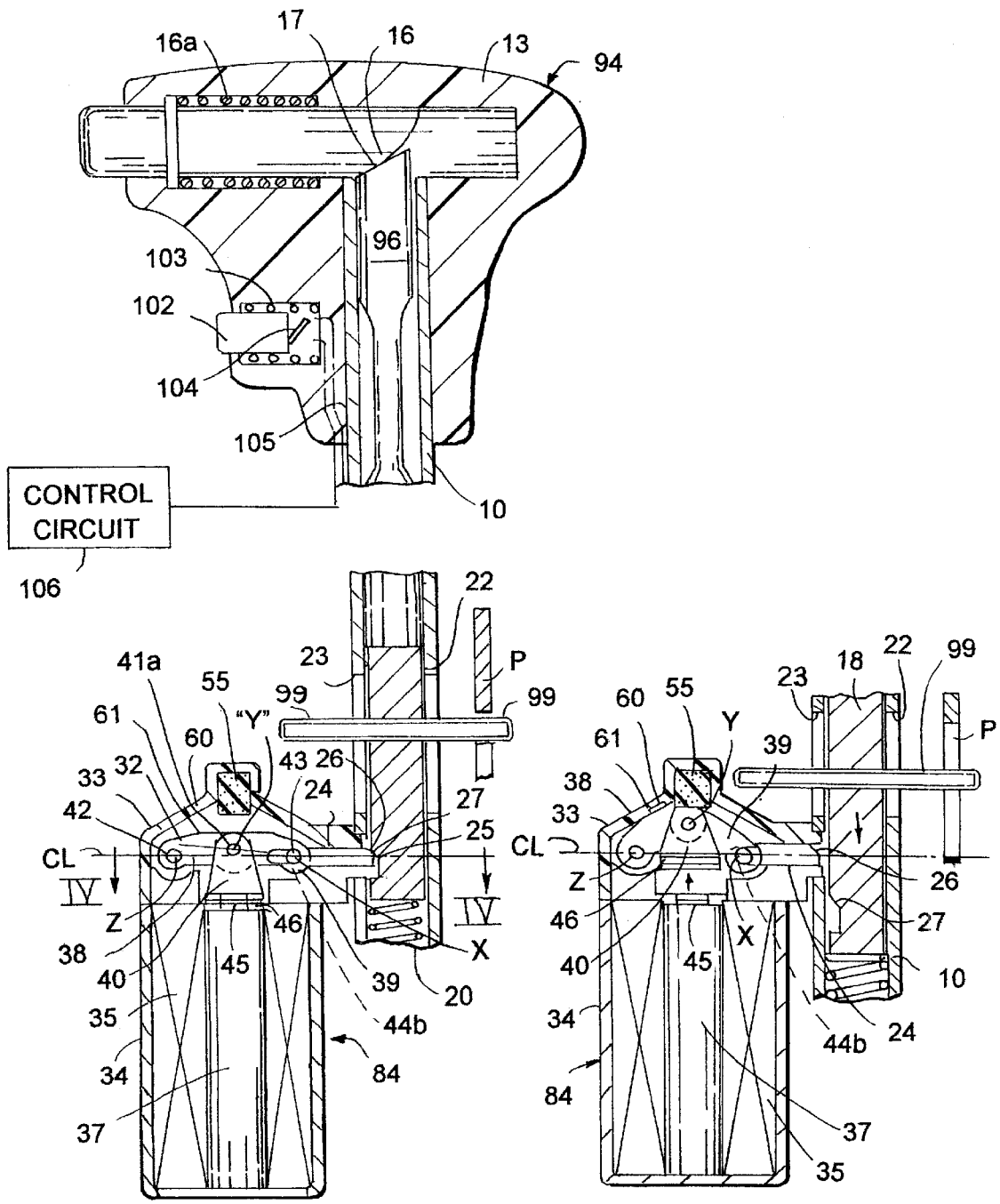

SHIFTER WITH AUTOMATIC AND MANUAL SHIFT MODES AND WITH SHIFT POSITION INDICATORS

CROSS-REFERENCE TO RELATED APPLICATIONS

This application claims benefit of provisional application filed under 37 C.F.R. 1.53(c), including provisional application Ser. No. 60/183,946, filed Feb. 22, 2000, entitled SHIFTER WITH AUTOMATIC AND MANUAL SHIFT MODES AND WITH SHIFT POSITION INDICATORS.

BACKGROUND

This application relates to vehicle shifters for shifting vehicle transmissions, and more particularly relates to a shifter having a shift lever selectively movable into automatic and manual shift modes through corresponding shift paths, and further, to a shifter having a shift lever position indicator for the same.

Recently, vehicle manufacturers have desired shifters that permit a vehicle driver to selectively switch between an automatic shift mode and a manual shift mode. In the automatic shift mode, the vehicle control system is configured to shift the vehicle transmission automatically based on the shift lever being moved to a given gear. Further, when the shift lever is moved to a drive position, the transmission automatically shifts between different drive gears (e.g. first, second, third, and overdrive gears) as needed for good vehicle operation. In the manual shift mode, the shift lever is initially positioned in a predetermined drive gear position, and the shift lever is moved between "up" and "down" shift positions in order to step the transmission through successive gear changes. Typically, the shifter includes a shift lever that can be moved along a first shift path having park, reverse, neutral, and drive (i.e. the automatic shift mode), and can be moved over to a second shift path having an up shift and a downshift position. In most shifters having automatic and manual modes, the first and second shift paths extend parallel each other and a transverse path connects them to form an "H" or "Z" shaped pattern. However, in some such shifters, the first and second shift paths form a "T" shaped pattern.

A problem is that these shifter constructions require many additional parts and pieces, since the shift lever must be operably supported in both the automatic and manual shift modes, yet the transmission must not be mis-shifted. For example, in cable-operated shifters, a transmission cable is commonly used to shift the transmission when in the automatic shift mode. It is important that the transmission cable be immobilized or otherwise inoperative when the shift lever is in the manual shift mode so that the transmission is not accidentally shifted by the transmission cable when the "up" and "down" shift movements of the shift lever are supposed to control shifting of the transmission. Still further, the shifter configurations must allow the shift lever to be moved back and forth between the automatic and manual shift paths, but also preferably bias the shift lever into one or the other of the shift paths to assure that the shift lever is moved completely and positively into one or the other of the shift paths. It is generally not acceptable to allow the shift lever to be left in a partially engaged position. Notably, the "H", "Z", and "T" patterns require the vehicle driver to learn where the shift lever is to be moved for the automatic shift mode and for the manual shift mode. It is desirable to construct a shifter having a shift pattern that is intuitive and/or more natural. It is also important that the shifter construction maintains a position of the driver's hand at an optimal position for shifting the shift lever so that the shift lever is easily shifted in all gear positions, and so that the shift lever is most enjoyable to shift. Notably, comfort during shifting to a vehicle driver and the "fun" of shifting are typically important features in vehicles that incorporate the automatic and manual shift modes, such that these are not incidental considerations.

It is also problematic to provide shift position indicators for shifters having automatic and manual shift modes. The shift position indicators must be clear, yet they must take up only a limited amount of space. Further, they must be accurate, since drivers quickly become very frustrated and imply poor quality into the entire vehicle if the shift position indicators are not easy to read or if they are poorly aligned with the gear position that they are attempting to indicate. Another problem is that they must use a minimum number of parts and components, yet they must identify the shift lever position in all possible positions.

Accordingly, an apparatus solving the aforementioned problems and having the aforementioned advantages are desired.

SUMMARY OF THE INVENTION

In one aspect of the present invention, a shifter is provided for shifting a vehicle transmission having a plurality of gears including a plurality of drive gears, where the vehicle transmission is configured to cooperate with a vehicle control system to shift automatically between the plurality of drive gears and to shift manually between the plurality of drive gears. The shifter includes a base and a shift lever pivoted to the base for movement along a single planar shift path. The single planar shift path includes a first portion having an automatic-shift drive position and includes a second portion having a manual-shift drive position. A switch is associated with the shift lever for changing between an automatic shift mode where the first portion is operable, and a manual shift mode where the second portion is operable.

In another aspect, a shifter is provided for shifting a vehicle transmission having a plurality of gears including a plurality of drive gears, with the vehicle transmission being configured to cooperate with a vehicle control system to shift automatically between the plurality of drive gears and to shift manually between the plurality of drive gears. The shifter includes a base and a shift lever pivoted to the base for movement along a shift path between park, reverse, neutral and drive gear positions. The shift lever is further pivoted for movement from the drive gear position selectively to upshift and downshift positions, with one of the upshift and downshift positions being located on or between the reverse, neutral and drive gear positions. A switch is operably connected to the shift lever for changing from a first shift mode where the shift lever can be shifted between the park, reverse, neutral and drive gear positions, and for changing to a second shift mode where the shift lever can be manually shifted between the drive, upshift and downshift positions.

In another aspect, a shifter is provided for shifting a vehicle transmission. The shifter includes a shift lever movable between an automatic shift mode and a manual shift mode, and a shift lever position indicator including first indicia for indicating shift lever positions when in the automatic shift mode and second indicia for indicating shift lever positions when in the manual shift mode. The shift lever position indicator further includes a first polarized screen and a first polarized light source arranged to selectively illuminate the first indicia only when the shift lever is in the automatic shift mode. The shift lever position indicator further includes a second polarized screen and a second polarized light source arranged to selectively illuminate the second indicia only when the shift lever is in the manual shift mode.

In another aspect, a shifter is provided for shifting a vehicle transmission having a plurality of gears including a plurality of drive gears, with the vehicle transmission being configured to cooperate with a vehicle control system to shift automatically between the plurality of drive gears and to shift manually between the plurality of drive gears. The shifter includes a base and a shift lever assembly pivoted to the base for movement between an automatic-shift mode and a manual-shift mode. The shift lever assembly includes a lever section pivoted to the base for pivoting movement both while in the automatic-shift mode and while in the manual-shift mode. The shifter further includes a transmission-cable-connected section pivoted for pivoting movement while in the automatic-shift mode but not for movement while in the manual-shift mode. The shifter still further includes an electrical device configured to fix the transmission-cable-connected section to the lever section for movement with the lever section when in the automatic-shift mode, but configured to fix the transmission-cable-connected section to the base when in the manual-shift mode. A switch is operably connected to the electrical device to selectively operate the electrical device.

In another aspect, a shifter for shifting a vehicle transmission includes a shift lever movable between an automatic shift mode and a manual shift mode. The shifter further includes a shift lever position indicator with indicia for indicating shift lever positions when in one of the automatic and manual shift modes. The shift lever position indicator further includes a polarized screen and a polarized light source arranged and controlled to selectively operate and illuminate the indicia only when the shift lever is in the one shift mode.

These and other features, advantages, and objects of the present invention will be further understood an appreciated by those skilled in the art by reference to the following specification, claims, and appended drawings.

DESCRIPTION OF DRAWINGS

FIG. 2 is a cross sectional side view of the shift lever assembly including its toggle park-interlock mechanism of FIG. 1;

FIG. 3 is a fragmentary view of the toggle park-interlock mechanism of FIG. 2, the mechanism being in an extended interlocked position;

DETAILED DESCRIPTION OF PREFERRED EMBODIMENT

Figure 1:
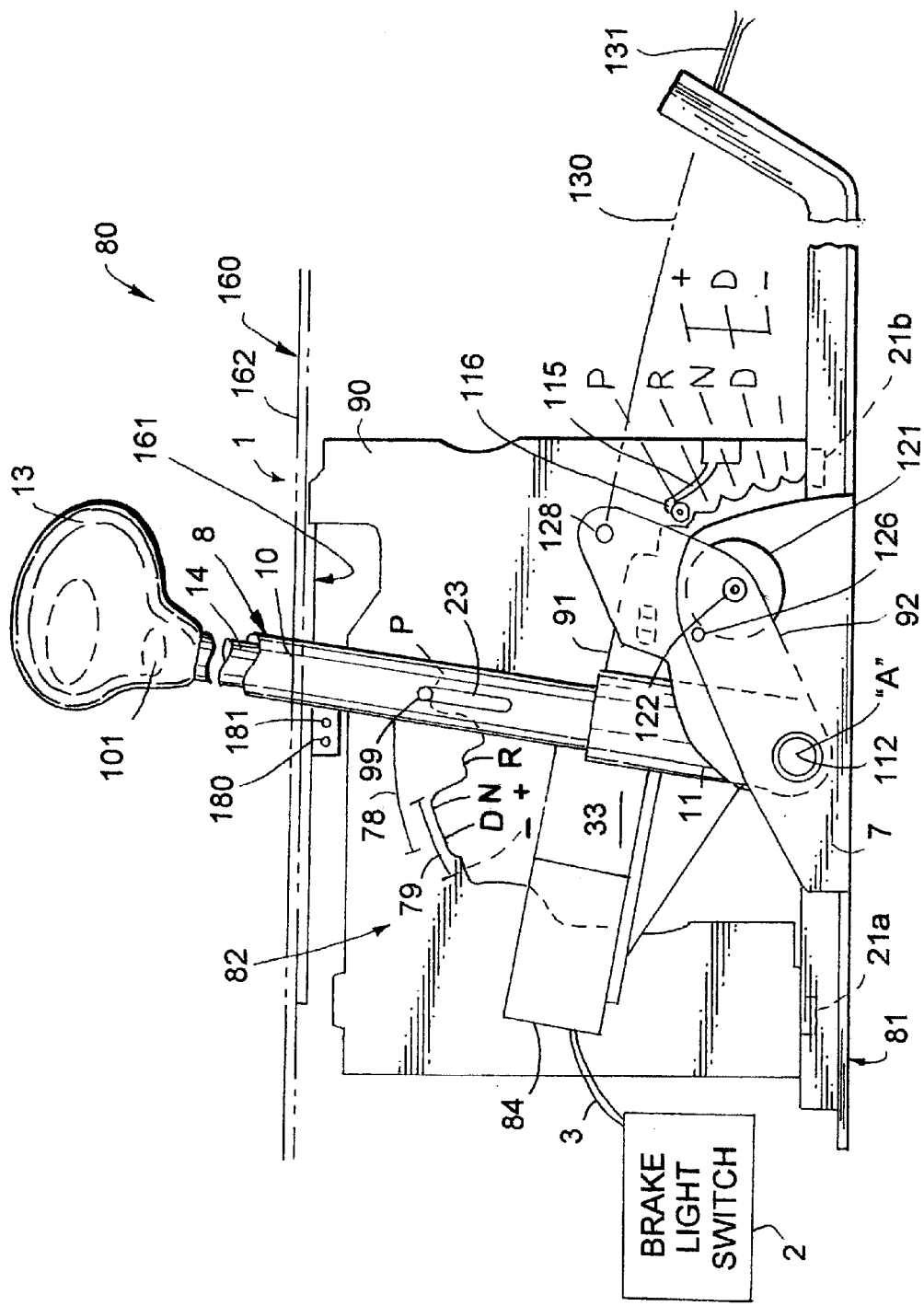
FIG. 1 is a side view of a shifter embodying the present invention.

A shifter 80 (FIG. 1) embodying the present invention is provided that moves along a single shift path and that is configured to shift a vehicle transmission between an automatic-shift mode and a manual-shift mode. The shifter 80 includes a base 81 and a shift lever assembly 82 pivoted to the base 81 for movement along a single planar shift path. The single planar shift path includes a first portion 78 having a park position "P", a reverse position "R", a neutral position "N" and an automatic-shift drive position, and further includes a second portion 79 having an upshift position "+", a manual drive position "D", and a downshift position "−". In a preferred form, the first and second portions overlap and lie in the same plane, with the "+" position being the same as the neutral position "N". A switch 101 is provided on a handle of the shift lever for switching between the automatic-shift mode and the manual shift mode. The shifter construction provides a simplified arrangement that is intuitive to use, and that has greatly simplified components and fewer components.

Notably, the present shifter 80 includes some structure that is similar to the shifter shown in co-assigned Osborn et al U.S. Pat. No. 5,677,658, issued Oct. 14, 1997, entitled: ELECTRICALLY OPERATED CONTROL MODULE FOR A LOCKING MECHANISM. For example, the structure and operation of the toggle mechanism of the park lock device 84 is well described in the U.S. Pat. No. 5,677,658, and accordingly that discussion will not be repeated herein. The entire contents of the U.S. Pat. No. 5,677,658 are incorporated herein for the purpose of providing a complete disclosure.

The base 81 includes a detent plate 90 (FIG. 1) having an arching portion with notches defined therein defining the shift lever positions "P", "R", "N", and "D". A pawl 99 on the shift lever assembly 82 operably engages the shift lever positions, as described below. Notably, the notches permit the lever section 91 and the pawl 99 to move slightly rearward of the "D" position when the shift lever assembly is in the manual shift mode, as discussed below.

Figure 4:
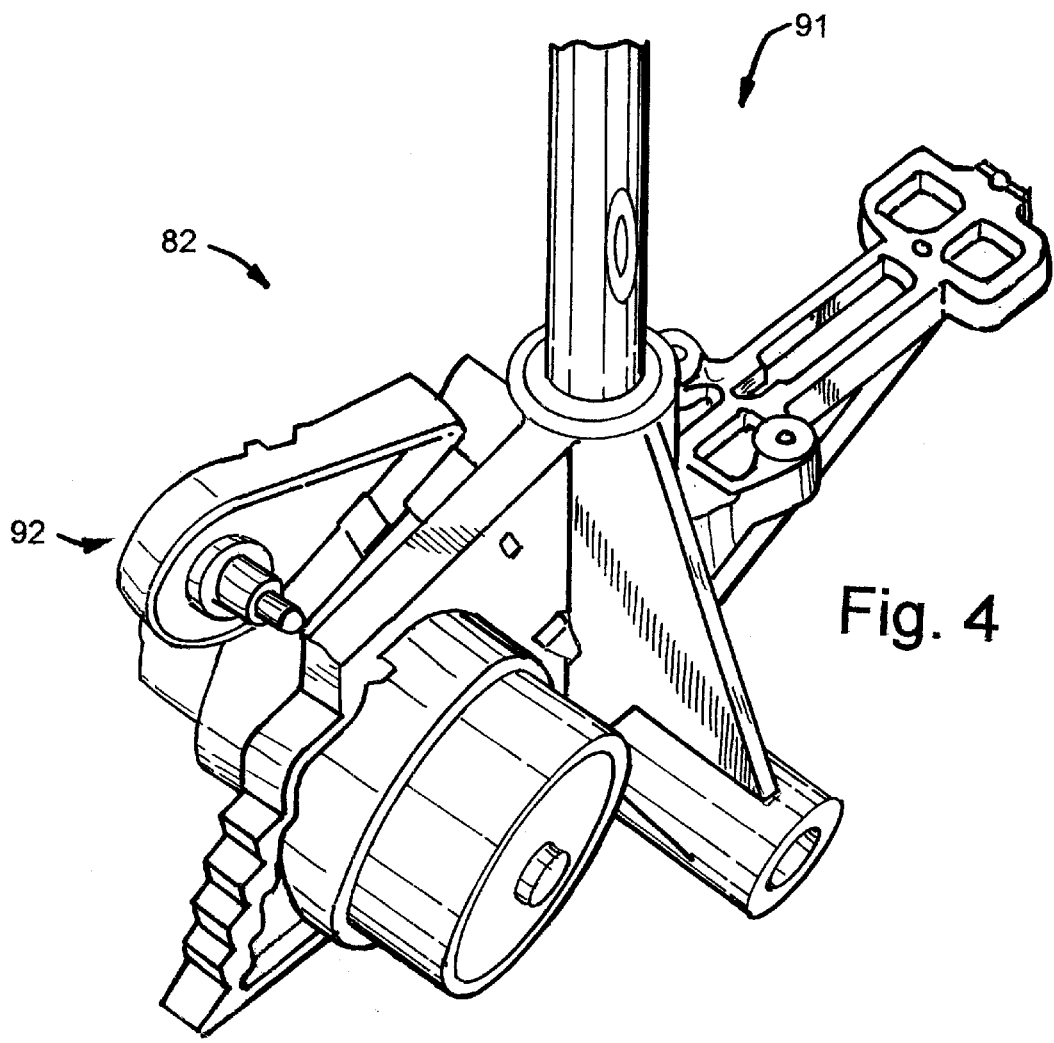
FIG. 4 is a fragmentary rear perspective view of a bottom of the shift lever assembly shown in FIG. 1.
Figure 5:
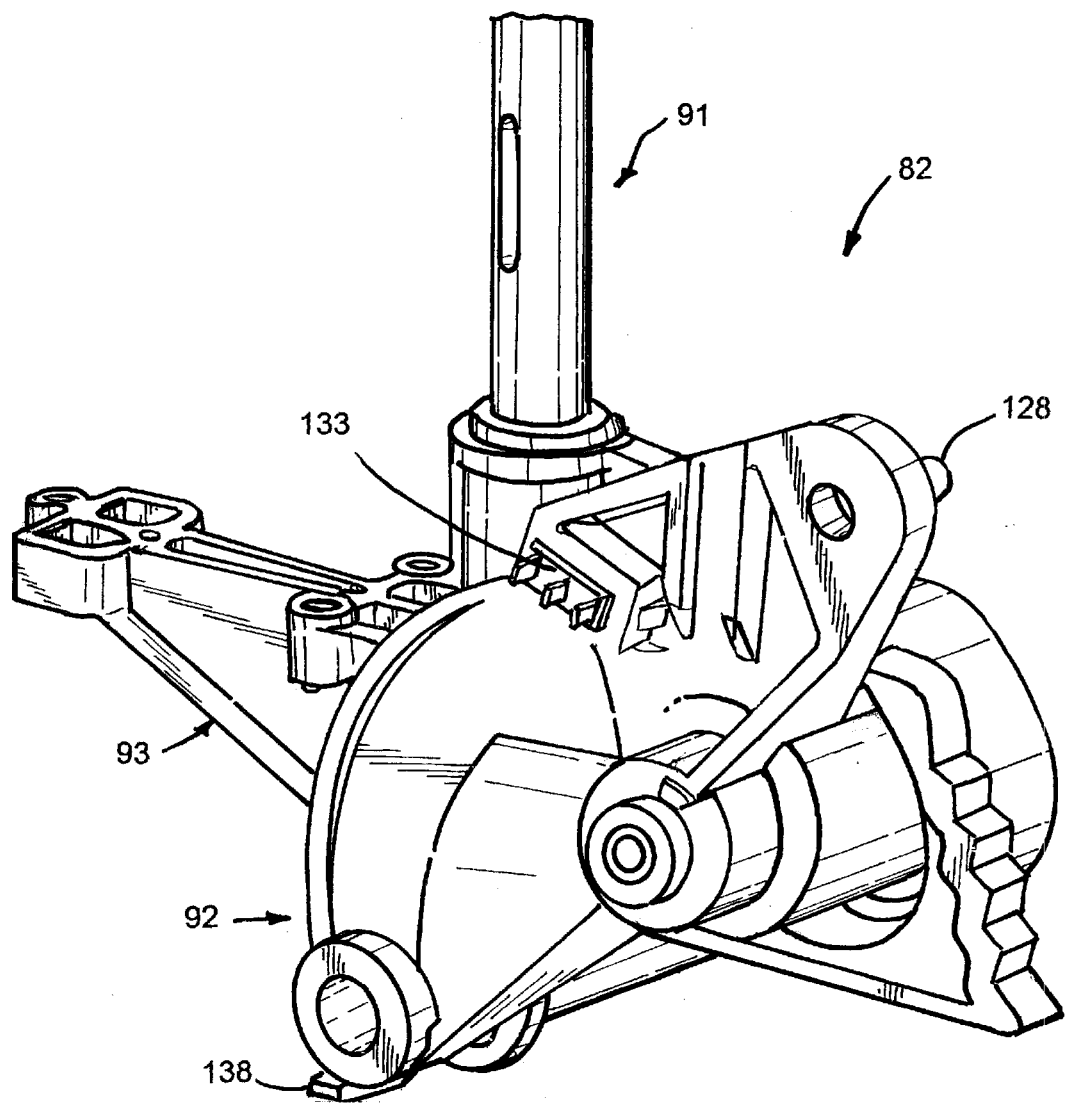
FIG. 5 is a fragmentary front perspective view of FIG. 4.
Figure 6:
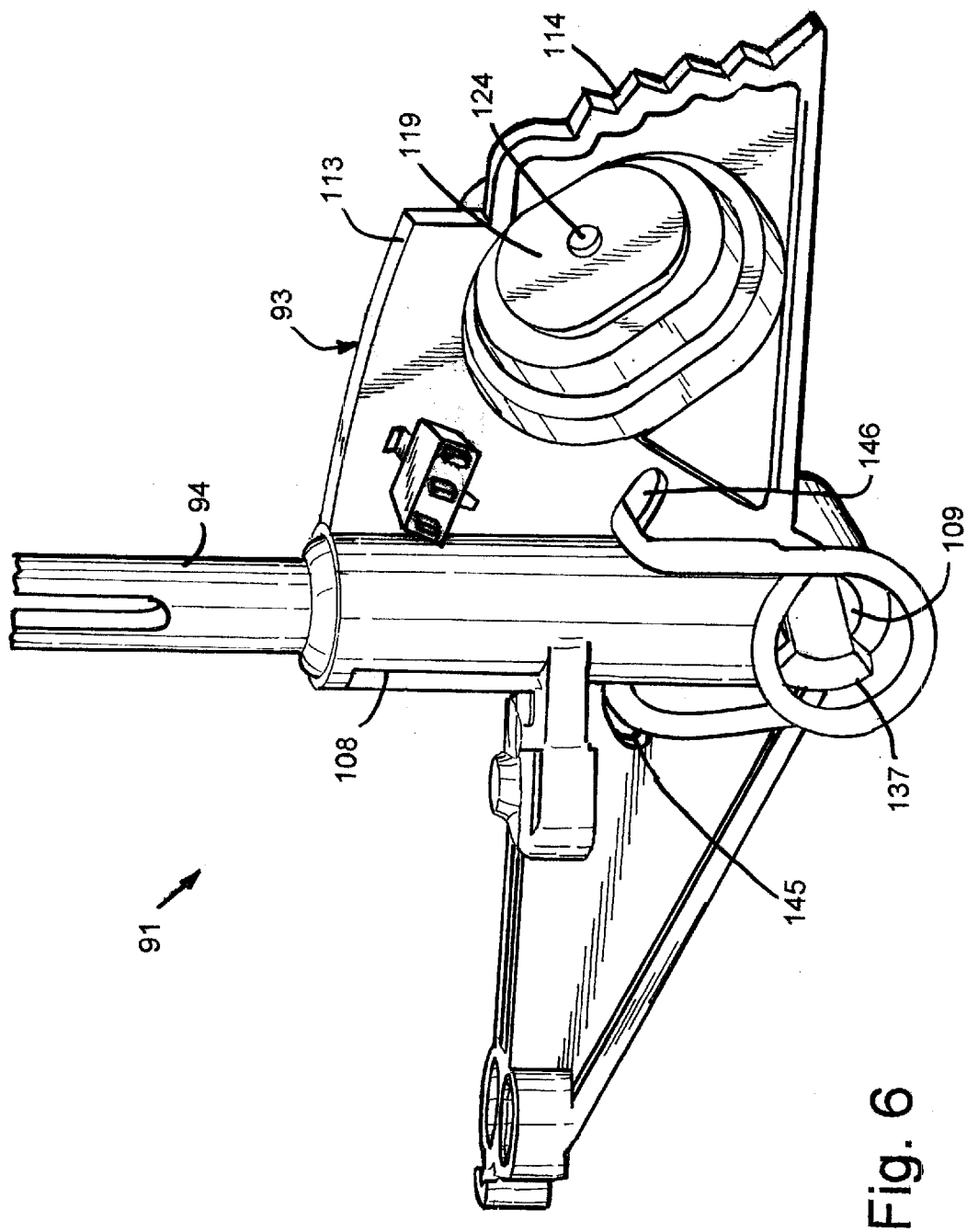
FIG. 6 is a fragmentary front perspective view of the lever section of the shift lever assembly shown in FIG. 5.
Figure 7:
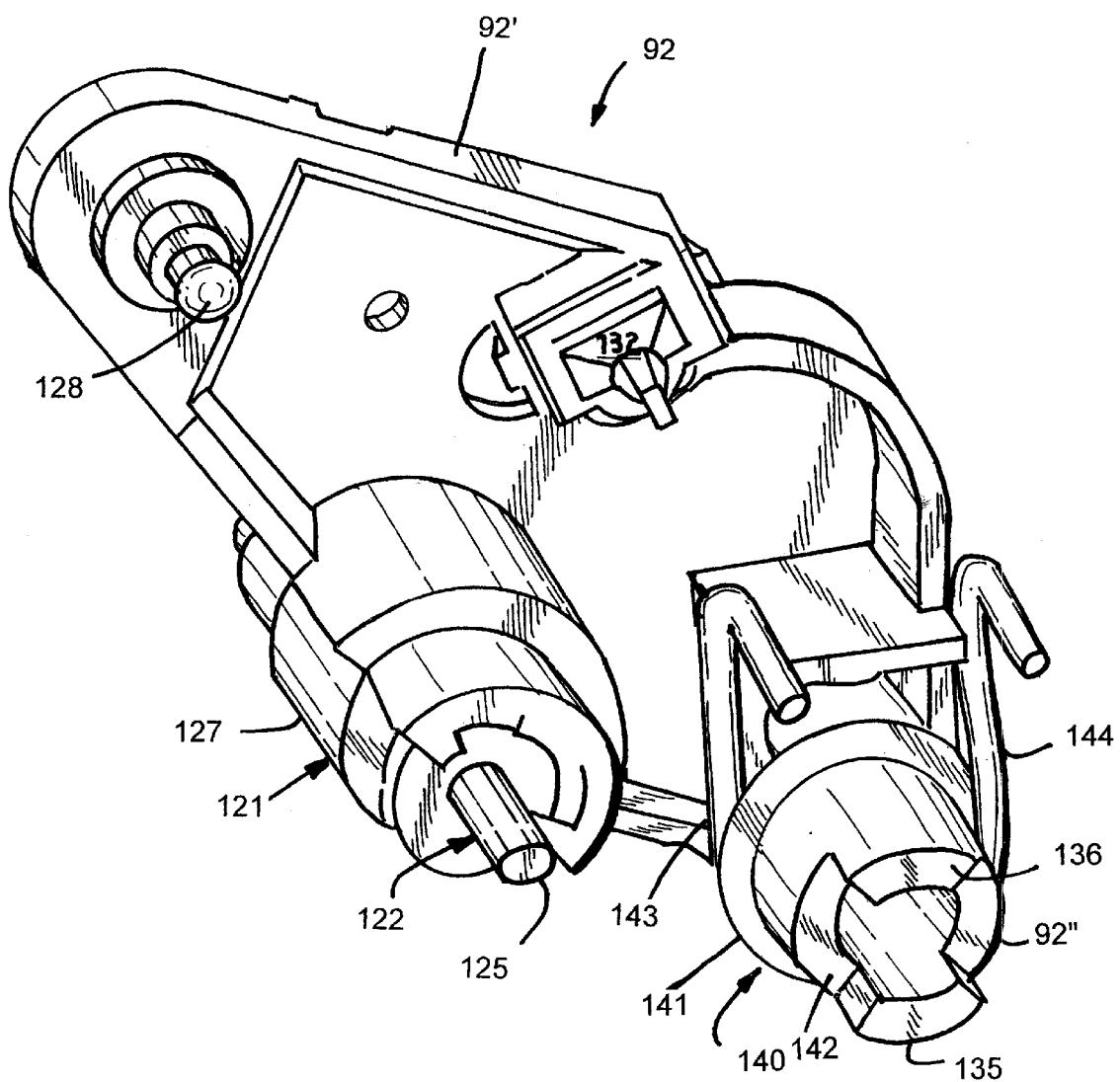
FIG. 7 is a perspective view of the transmission-cable-connected section of the shift lever assembly shown in FIGS. 4 and 5.
Figure 9:
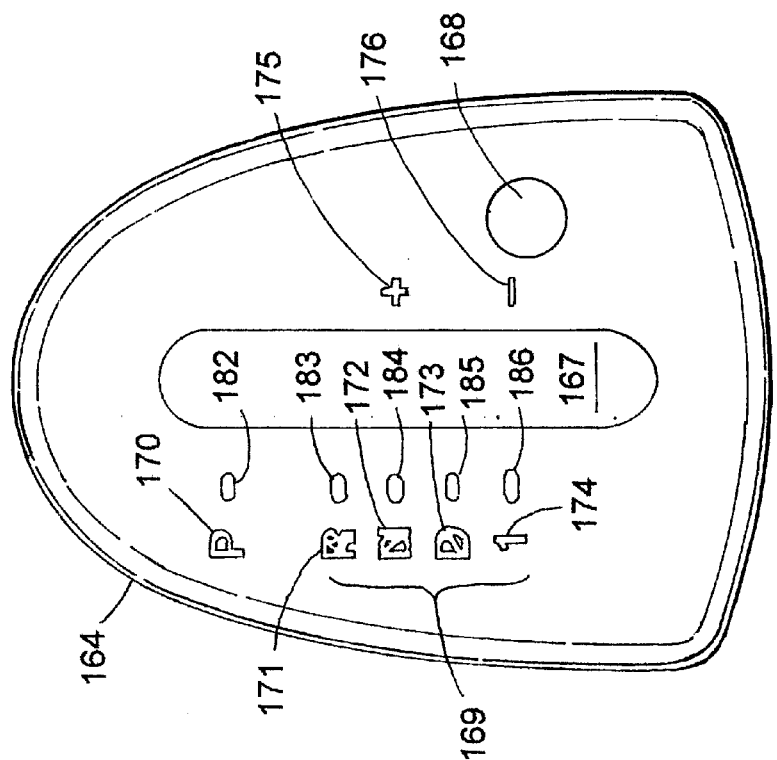
FIG. 9 is a plan view of one layer of the cover in FIG. 8, the layer being a silk-screened panel having overlapping first and second indicia outlined thereon.
Figure 8:
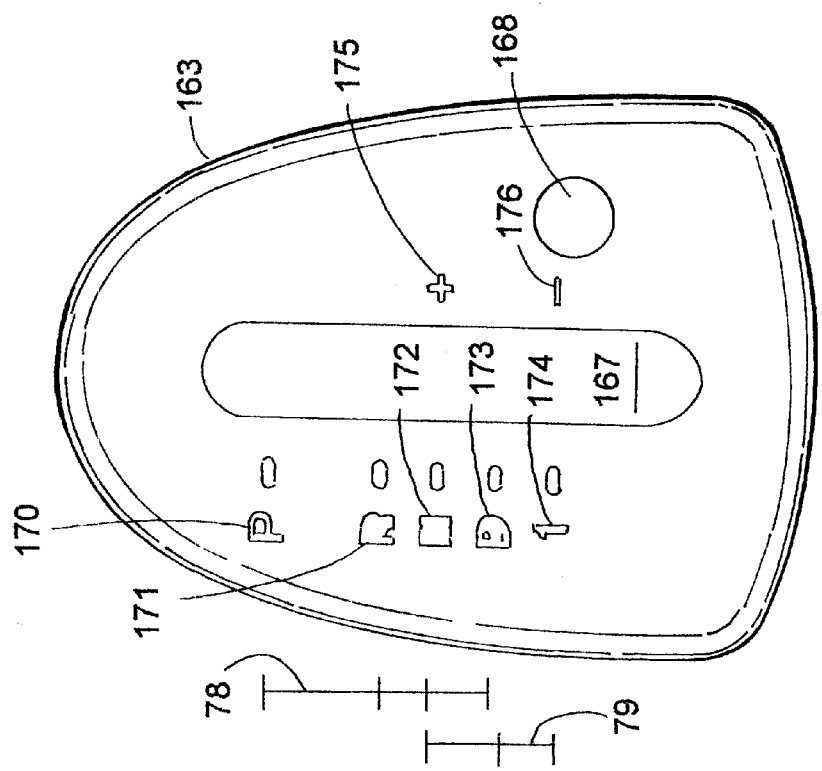
FIG. 8 is a plan view of the cover assembly shown in FIG. 1.
Figure 11:
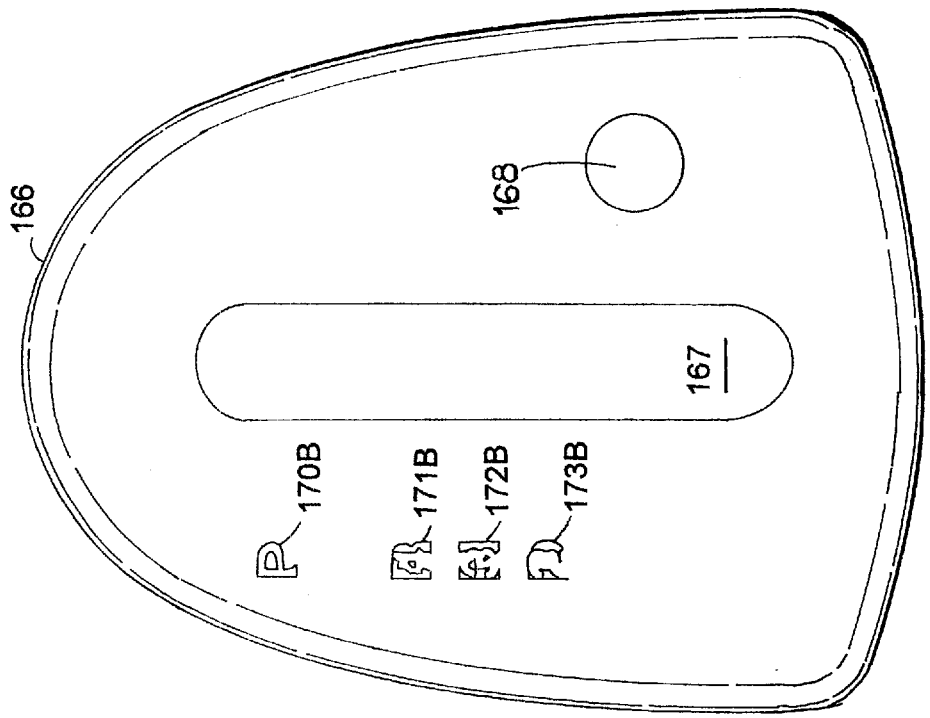
FIG. 11 is a plan view of another layer of the cover in FIG. 8, this layer being vertically polarized screen for blocking out parts of the overlapping indicia to thus show only the second indicia.
Figure 10:
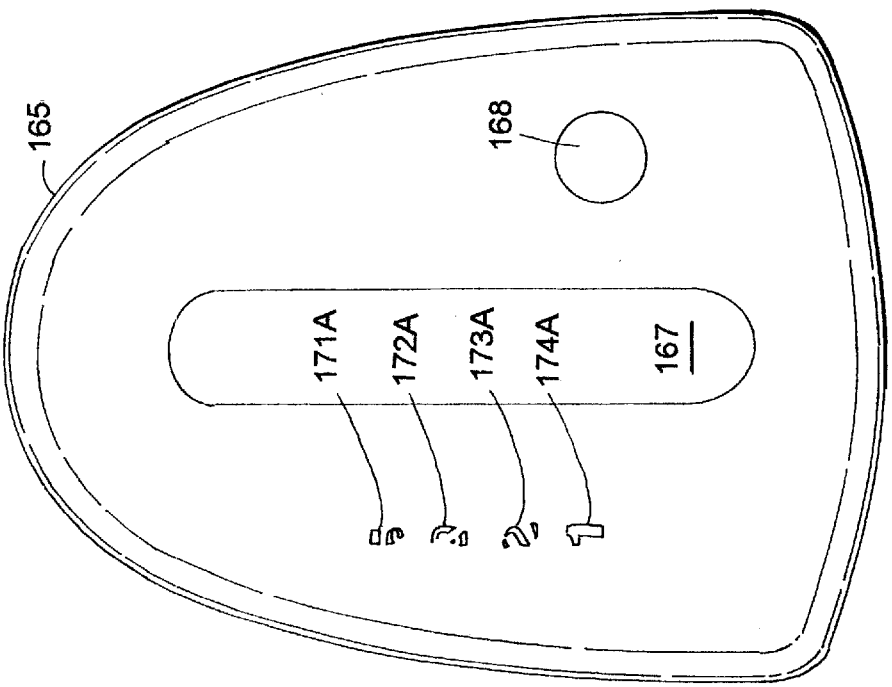
FIG. 10 is a plan view of another layer of the cover in FIG. 8, this layer being horizontally polarized screen for blocking out parts of the overlapping indicia to thus show only the first indicia.

The shift lever assembly 82 (FIGS. 4–5) includes a lever section 91 (FIGS. 4–6) and a transmission-cable-connected section 92 (FIGS. 4, 5, and 7). The lever section 91 (FIG. 6) includes a molded body 93, a post 94' secured to molded body 93, and a handle 94 (FIG. 2) secured atop the post 94'. A pawl-operating button 95 is operably positioned in the handle 94 and is connected to a straw 96 that extends longitudinally through the post 94' for operating a pawl 99. The interlock device 84 interacts with the straw to limit movement of the pawl 99 out of the park position "P" until predetermined vehicle conditions are met.

A second switch 101 (FIG. 2) is operably positioned in the handle 94. The switch 101 includes an actuator button 102, a spring 103 biasing it outwardly, electrical contacts 104 for completing an electrical circuit, and wire conductors 105 for communicating with a control circuit 106. The switch 101 permits a vehicle driver to selectively switch between the automatic-shift mode and the manual-shift mode, as described below.

The molded body 93 (FIG. 6) includes a vertical section 108 with a bore for receiving post 94', and further includes a horizontal bore 109 for receiving a main pivot pin 112 (FIG. 1) to pivot the shift lever assembly 82 to the base 81. The molded body 93 (FIG. 6) includes a front flange 113 with undulations 114 for receiving a spring biased feel positioner 115 (FIG. 1). The feel positioner 115 includes a roller 116 at one end that rollingly engages the undulations 114 and that settles in depressions corresponding to the P, R, N, and D positions as the shift lever assembly 82 is pivoted between the gear positions P, R, N and D. This provides a vehicle driver with a clear and good feel as the shift lever assembly 82 is moved. The depressions for lever positions N and D (when the lever subassembly 82 is in the automatic shift mode) also correspond to the upshift and center positions "+" and "D" (when the shift lever subassembly 82 is in the manual mode). The depressions also include an "extra" depression that corresponds to the downshift position "−" (when the shift lever subassembly 82 is in the manual mode). A rear flange 118 extends from the molded body 93 and forms a mount for the park lock mechanism 84. The molded body 93 includes an elongated molded chamber 119 shaped to receive an electromechanical device 121.

The cable-connected section 92 (FIG. 7) includes a second molded body 92' with a lower section 92" having a transverse bore shaped to receive the main pivot pin 112. The electromechanical device 121 is attached to a midportion of the cable-connected section 92 on a mount 121'. The electromechanical device 121 includes an extendable pin 122 with a first end 123 positioned to engage a hole 124 (FIG. 6) in the molded chamber 120 when in a normally retracted position, and includes a second end 125 positioned to engage a hole 126 (FIG. 1) in the base 81 when in an extended position. The electromechanical device 121 includes a coil that extends the pin 122 when energized, a spring that retracts the pin 122 when de-energized, and a coil housing 127 (FIG. 7). When the device 121 is de-energized, the cable-connected section 92 is fixed to the molded body 93 by the pin 122 engaging hole 124, but when the device 121 is energized, the cable-connected section 92 is released from the molded body 93 and fixed to the base 81 by the other end of the pin 122. A universal connector 128 is attached to an upper end of the cable-connection section body 92' and includes a protrusion 129 that can be resiliently engaged by an end of a transmission cable 130 (FIG. 1) in a transmission cable assembly 131. A first bipole switch component 132 (FIG. 7) is mounted on the body 92' and a second bipole switch component 133 is mounted on the molded body 93 in a location where the second component 133 will engage the first component 132 to indicate upshift and downshift movement of the lever section 91 relative to cable connected section 92.

A pair of tabs 135 and 136 (FIG. 7) extend inwardly and laterally from the body 92' and form a space for receiving an outwardly/laterally-extending tab 137 on the molded body 93. In the manual shift mode, the tab 137 is moved into engagement with and stopped by the tab 135 as the lever section 92 is pivoted to the upshift position "+". In the manual shift mode, the tab 137 is moved into engagement with and stopped by the tab 136 as the lever section 92 is pivoted to the downshift position "−". Tab 138 (FIG. 5) extends in an opposite direction toward the base 81 from the cable-connected section 92. In the automatic shift mode, the tab 138 engages a stop on the base 81 when the shift lever assembly 82 is pivoted to the drive position D to prevent movement of the shift lever subassembly 82 beyond the drive position D to the downshift position "−". The shift lever subassembly 82 is only prevented from moving into the downshift position "−" when the shift lever subassembly 82 is in the automatic shift mode and when the pin 122 interlocks the cable-attached section 92 to the lever section 91.

A wire spring 140 (FIG. 7) includes a coil portion 141 that wraps around the lateral boss 142 of the cable-connected section 92, and includes a pair of spring arms 143 and 144 that extend toward the lever section 91. The spring arms 143 and 144 extend into apertures 145 and 146 in the lever section 91 (FIG. 6), and are configured to bias lever section 91 toward centered position relative to the cable-connected section 92. Thus, when the shift lever subassembly 82 is in the manual mode, the lever section 91 is biased from the upshift position toward the centered drive position D, and also is biased from the downshift position toward the centered drive position D. Notably, the feel positioner 115 (FIG. 1) combines with the spring 140 when the lever section 91 is near the centered drive position D, but the feel positioner 115 actually opposes the spring 140 when the lever section 91 is close to the upshift position "+" or close to the downshift position "−". This combination has been found to provide a good feel to an operator driving a vehicle since it provides a heightened force when a driver initially moves the lever section 91 from the position D toward the upshift position (or downshift position. The overall effect of the feel positioner 115 is affected by the shape of the depressions, the roller 116, and related components.

A cover 160 (FIG. 1) is configured to attach to a vehicle component over the shifter 80 to aesthetically cover the same, while simultaneously also allowing the shift lever subassembly 82 to move between the different gear positions. A shift lever position indicator 161 is incorporated into the cover 160. The shift lever position indicator 161 is configured to indicate a position of the shift lever in all its positions, including positions in the automatic shift mode and in the manual shift mode. The shift lever position indicator 161 includes a rigid support panel 162 providing rigidity to the indicator 161. A multi-layer assembly 163 includes multiple films 164–166 (FIGS. 8–11) that are adhered or otherwise fixed together and that are bonded or otherwise fixed to the support panel 162. Each of the films 164–166 has a slot 167 for receiving the post 94' of the shift lever subassembly 91, and further includes a circular window or access opening 168 for accessing a mechanical park lock override (to be used if the car battery is dead.

The film 164 (FIG. 9) comprises a clear layer with black silk screening thereon, with indicia 169 being formed along one side of the slot 167. The indicia 169 includes indicia symbols 170, 171, 172 and 173 that correspond to the gear positions "P", "R", "N", and "D" when the shift lever is in the automatic shift mode. The symbols 171, 172, and 173 and also another indicia symbol 174 correspond to the transmission gear positions 4th, 3rd, 2nd, and 1st gears when the shift lever is in the manual shift mode. The symbol 171 is a composite of an "R" and a "4". The symbol 172 is a composite of an "N" and a "3". The symbol 173 is a composite of a "D" and a "2". There are also indicia symbols 175 and 176 that form a "+" and a "−", which correspond to the upshift and downshift positions, respectively. The film 164 has a front surface that provides a visually "dead front" so that the indicia 170–176 cannot be seen unless they are lighted.

The film 165 (FIG. 10) comprises a film that has a transparent or translucent appearance in the area of the symbols 170–176. The film 165 includes symbol fragments 171A–175A that comprises a horizontally polarized material adapted to block vertically polarized light (FIG. 1). The symbol fragments 171A–174A are shaped to block out portions of the symbols 171–173, such that the symbols, when lighted by the vertically polarized light source 180, look like the letters "R", "N", and "D". The symbol 174 is completed blocked out while the symbol 170 is not blocked out at all. The polarized light source 180 is energized to emit light when the shift lever subassembly 82 is in the automatic shift mode. The light source 180 is stationary and illuminates the letters "P", "R", "N", and "D" evenly. The marker windows 182–186 (FIG. 9) are illuminated by LED's positioned under each window. Alternatively, it is contemplated that the windows 182–186 are illuminated by a light source that moves as the shift lever moves to selectively illuminate windows 182–186 as the shift lever is moved.

The film 166 (FIG. 11) comprises a film that has a transparent or translucent appearance in the area of the symbols 170–174. The film 166 includes symbol fragments 170B–173B that comprises a vertically polarized material adapted to block horizontally polarized light (FIG. 1). The symbol fragments 170B–173B are shaped to block out portions of (or all of) the symbols 170–173, such that the symbols 171–174, when lighted by the horizontally polarized light 181, look like the numbers "4", "3" and "2" and "1". The symbol 170 (i.e. the letter "P") is completed blocked out. The polarized light source 181 is energized to emit light when the shift lever subassembly 82 is in the manual shift mode. The light source 181 is controlled by the vehicle electrical control system to illuminate the automatic shift mode symbols "PRND" when the automatic shift mode is selected, or the manual shift mode symbols "4,3,2,1, and +,–" when the manual shift mode is selected, and to illuminate the correct window 182–186 when particular gear positions are selected.

Figure 12:
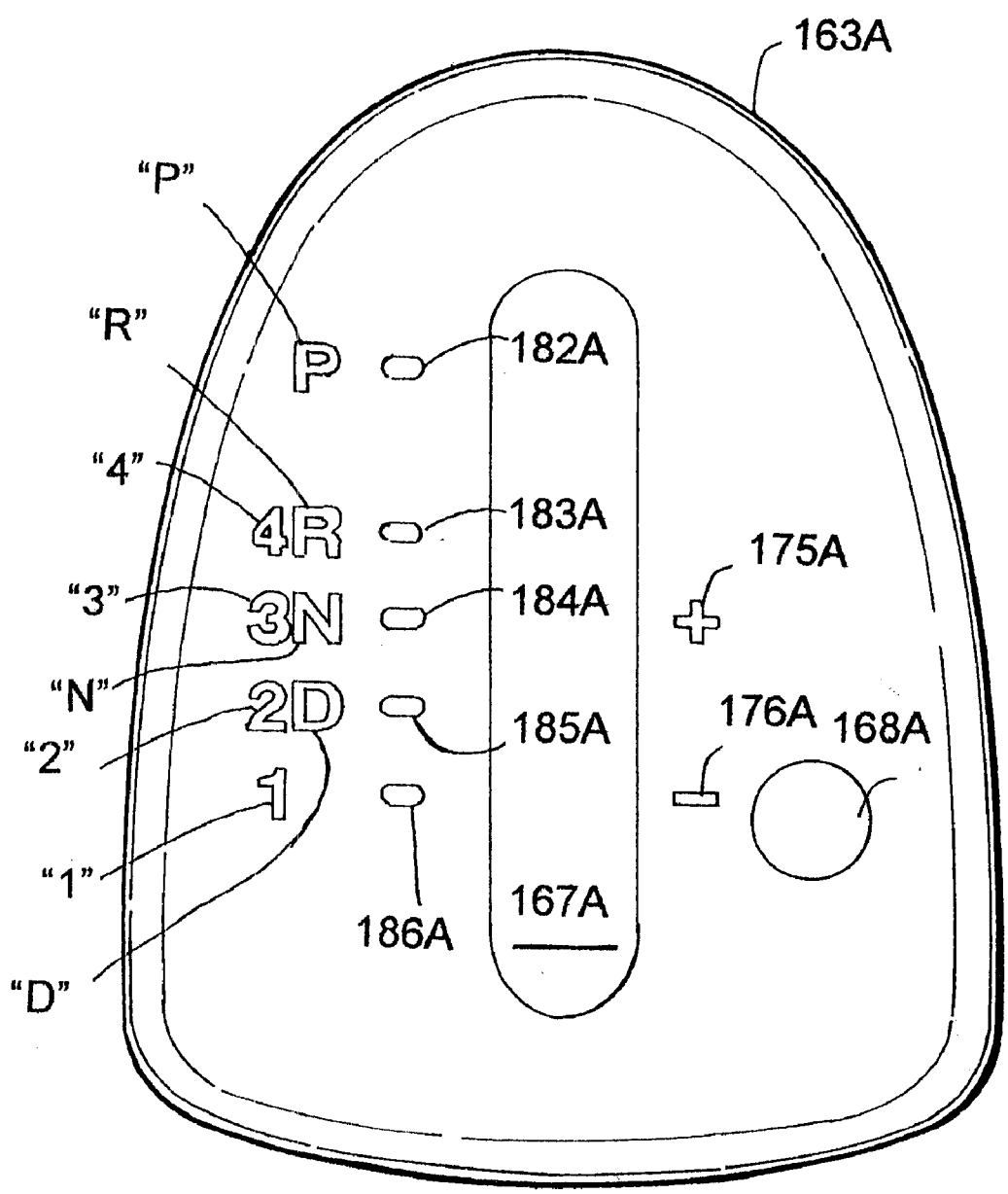
FIG. 12 is a plan view of a modified cover assembly.

FIG. 12 shows a modified cover 160A where the symbols "P,R,N,D" and "4,3,2,1" are arranged in two parallel but separate rows. In modified cover 160A, identical numbers are used to identify identical or similar features on cover 160, but with the addition of the letter "A". The control circuit (106, FIG. 2) is programmed so that the row of symbols "P,R,N,D" are partially lit up and the selected gear brightly indicated by selected window 182A–186A when the shifter is in the automatic shift mode. In the automatic shift mode, the symbols "4,3,2,1, +,–" are dark and not visible. The control circuit is further programmed so that the row of symbols "4,3,2,1, +, and –" are partially lit up and the selected gear brightly indicated by selected window 182A–186A when the shifter is in the manual shift mode. In the manual shift mode, the symbols "P,R,N,D" are dark and not visible. It is contemplated that bleed-over of light between the two rows of symbols can be prevented by use of an arrangement of polarized films (similar to films 164–166). Alternatively, a downwardly-extending light-shielding wall can be located under the cover 160A between the two rows to prevent crossover of light.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A shifter for shifting a vehicle transmission having a plurality of gears including a plurality of drive gears, the vehicle transmission being configured to cooperate with a vehicle control system to shift automatically between the plurality of drive gears and to shift manually between the plurality of drive gears, comprising:

a base;

a shift lever pivoted to the base for movement along a single planar shift path, the single planar shift path including a first portion having an automatic-shift drive position and including a second portion having a manual-shift drive position;

a switch associated with the shift lever for changing between an automatic shift mode where the first portion is operable, and a manual shift mode where the second portion is operable; and a shift lever position indicator including first indicia for indicating shift lever positions when in the automatic shift mode and second indicia for indicating shift lever positions when in the manual shift mode, the shift lever position indicator further including a first polarized screen and a first polarized light source arranged to selectively illuminate the first indicia only when the shift lever is in the automatic shift mode, the shift lever position indicator further including a second polarized screen and a second polarized light source arranged to selectively illuminate the second indicia only when the shift lever is in the manual shift mode.

2. The shifter defined in claim 1, wherein the first portion includes park, reverse, and neutral gear positions, as well as the automatic-shift drive position.

3. The shifter defined in claim 2, wherein the second portion includes the manual-shift drive gear position, as well as upshift and downshift gear positions.

4. The shifter defined in claim 1, wherein the first and second indicia overlap on each other.

5. A shifter for shifting a vehicle transmission having a plurality of gears including a plurality of drive gears, the vehicle transmission being configured to cooperate with a vehicle control system to shift automatically between the plurality of drive gears and to shift manually between the plurality of drive gears, comprising:

a base;

a shift lever pivoted to the base for movement along a single planar shift path, the single planar shift path including a first portion having an automatic-shift drive position and including a second portion having a manual-shift drive position;

a switch associated with the shift lever for changing between an automatic shift mode where the first portion is operable, and a manual shift mode where the second portion is operable, the first portion including park, reverse, and neutral gear positions, as well as the automatic-shift drive position, the second portion including the manual-shift drive gear position, as well as upshift and downshift gear positions;

a solenoid and extendable pin, the solenoid being connected to the switch and the extendable pin being positioned to engage and hold a cable connected section of the shift lever in a fixed position when extended;

wherein the automatic shift mode and the manual shift mode include overlapping sections.

6. The shifter defined in claim 5, wherein the upshift drive position and the neutral gear position overlap.

7. A shifter for shifting a vehicle transmission having a plurality of gears including a plurality of drive gears, the vehicle transmission being configured to cooperate with a vehicle control system to shift automatically between the plurality of drive gears and to shift manually between the plurality of drive gears, comprising:

a base;

a shift lever pivoted to the base for movement along a shift path between park, reverse, neutral and drive gear positions, and further for movement from the drive gear position selectively to upshift and downshift positions, with one of the upshift and downshift positions being located on or between the reverse, neutral and drive gear positions; and a switch operably connected to the shift lever for changing from a first shift mode where the shift lever can be shifted between the park, reverse, neutral and drive gear positions, and for changing to a second shift mode where the shift lever can be manually shifted between the drive, upshift and downshift positions;

a solenoid and extendable pin, the solenoid being connected to the switch and the extendable pin being positioned to engage and hold a cable connected section of the shift lever in a fixed position when extended.

8. A shifter for shifting a vehicle transmission having a plurality of gears including a plurality of drive gears, the vehicle transmission being configured to cooperate with a vehicle control system to shift automatically between the plurality of drive gears and to shift manually between the plurality of drive gears, comprising:

a base;

a shift lever assembly pivoted to the base for movement between an automatic-shift mode and a manual-shift mode, the shift lever assembly including a lever section pivoted to the base for pivoting movement both while in the automatic-shift mode and while in the manual-shift mode, and further including a transmission-cable-connected section for pivoting movement while in the automatic-shift mode but not for movement while in the manual-shift mode, and still further including an electrical device configured to fix the transmission-cable-connected section to the lever section when in the automatic-shift mode, but configured to fix the transmission-cable-connected section to the base when in the manual-shift mode; and a switch operably connected to the electrical device to selectively operate the electrical device.

9. The shifter defined in claim 8, wherein the electrical device includes an electromechanical device having an extendable pin that engages the lever section when in the automatic-shift mode, and that engages the base when in the manual-shift mode.

10. A shifter for shifting a vehicle transmission having a plurality of gears including a plurality of drive gears, the vehicle transmission being configured to cooperate with a vehicle control system to shift automatically between the plurality of drive gears and to shift manually between the plurality of drive gears, comprising:

a base;

a shift lever pivoted to the base for movement along a single planar shift path, the single planar shift path including a first portion having an automatic-shift drive position and including a second portion having a manual-shift drive position;

a switch associated with the shift lever for changing between an automatic shift mode where the first portion is operable, and a manual shift mode where the second portion is operable; and a shift lever position indicator including indicia for indicating shift lever positions when in one of the automatic and manual shift modes, the shift lever position indicator further including a polarized screen and a polarized light source arranged and controlled to selectively operate and illuminate the indicia only when the shift lever is in the one shift mode.

11. The shifter defined in claim 10, including a control circuit that illuminates the first indicia and not the second indicia when the shift lever is in the automatic shift mode, and that illuminates the second indicia and not the first indicia when the shift lever is in the manual shift mode.

12. A shifter for shifting a vehicle transmission having a plurality of gears including a plurality of drive gears, the vehicle transmission being configured to cooperate with a vehicle control system to shift automatically between the plurality of drive gears and to shift manually between the plurality of drive gears, comprising:

a base;

a shift lever pivoted to the base for movement along a single planar shift path, the single planar shift path including a first portion having an automatic-shift drive position and including a second portion having a manual-shift drive position;

a switch associated with the shift lever for changing between an automatic shift mode where the first portion is operable, and a manual shift mode where the second portion is operable;

a shift lever position indicator including first indicia for indicating shift lever positions for the automatic shift mode and including second indicia for indicating shift lever positions for the manual shift mode; and a control circuit that illuminates the first indicia and not the second indicia when the shift lever is in the automatic shift mode, and that illuminates the second indicia and not the first indicia when the shift lever is in the manual shift mode; and wherein at least one of the first and second indicia includes at least one polarized light source and at least one polarized light film.

13. The shifter defined in claim 12, wherein the position indicator includes a cover and a light-wall between the first and second indicia.

14. A shifter for shifting a vehicle transmission having a plurality of gears including a plurality of drive gears, the vehicle transmission being configured to cooperate with a vehicle control system to shift automatically between the plurality of drive gears and to shift manually between the plurality of drive gears, comprising:

a base;

a shift lever pivoted to the base for movement along a single planar shift path, the single planar shift path including a first portion having an automatic-shift drive position and including a second portion having a manual-shift drive position;

a switch associated with the shift lever for changing between an automatic shift mode where the first portion is operable, and a manual shift mode where the second portion is operable; and a solenoid and extendable pin, the solenoid being connected to the switch and the extendable pin being positioned to engage and hold a cable connected section of the shift lever in a fixed position when extended.

15. The shifter defined in claim 14, wherein the extendable pin when retracted secures the cable connected section to the movable shift lever.

16. A shifter for shifting a vehicle transmission having a plurality of gears including a plurality of drive gears, the vehicle transmission being configured to cooperate with a vehicle control system to shift automatically between the plurality of drive gears and to shift manually between the plurality of drive gears, comprising:

a base;

a shift lever pivoted to the base for movement along a single planar shift path, the single planar shift path including a first portion having an automatic-shift drive position and including a second portion having a manual-shift drive position; and a switch associated with the shift lever for changing between an automatic shift mode where the first portion is operable, and a manual shift mode where the second portion is operable; and first and second indicia on the base corresponding to the automatic-shift drive position and the manual-shift drive position, respectively, the first and second indicia each having at least one indicia element overlapping on the other one indicia element.

17. The shifter defined in claim 16, including a control circuit that includes first indicia for indicating shift lever positions for the automatic shift mode and including second indicia for indicating shift lever positions for the manual shift mode; and a control circuit that illuminates the first indicia and not the second indicia when the shift lever is in the automatic shift mode, and that illuminates the second indicia and not the first indicia when the shift lever is in the manual shift mode.

* * * * *